(No Model.) 4 Sheets—Sheet 1.

H. A. SMALLFIELD & H. EDWARDS.
SAUSAGE TWISTING AND LINKING MACHINE.

No. 480,293. Patented Aug. 9, 1892.

Witnesses:
Inventors,
H. A. Smallfield
and
Harry Edwards,
By Higdon & Higdon
Attys.

(No Model.) 4 Sheets—Sheet 2.
H. A. SMALLFIELD & H. EDWARDS.
SAUSAGE TWISTING AND LINKING MACHINE.
No. 480,293. Patented Aug. 9, 1892.
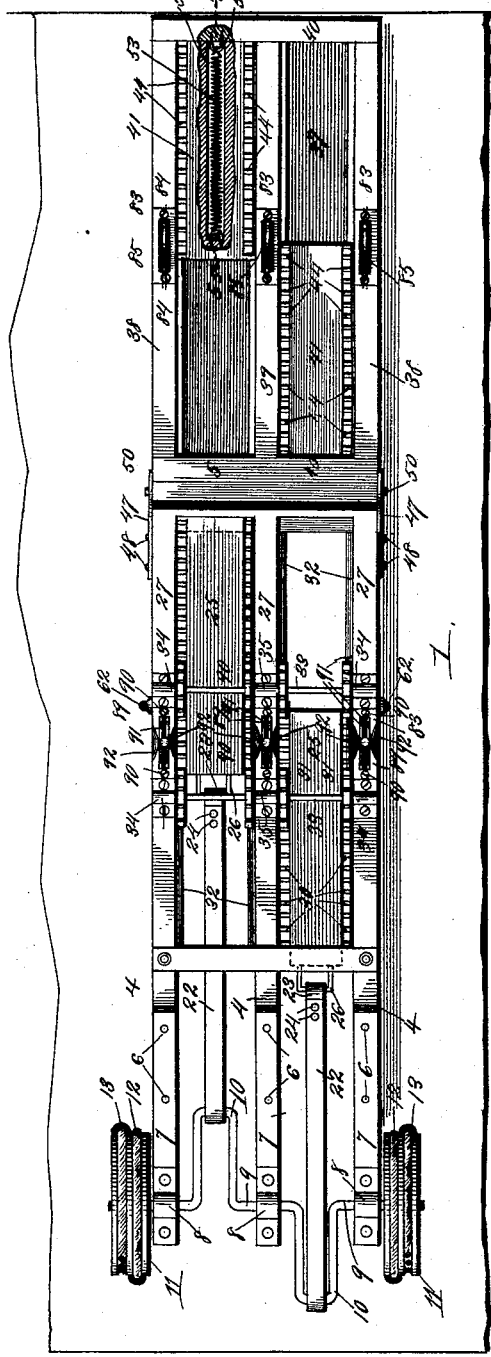
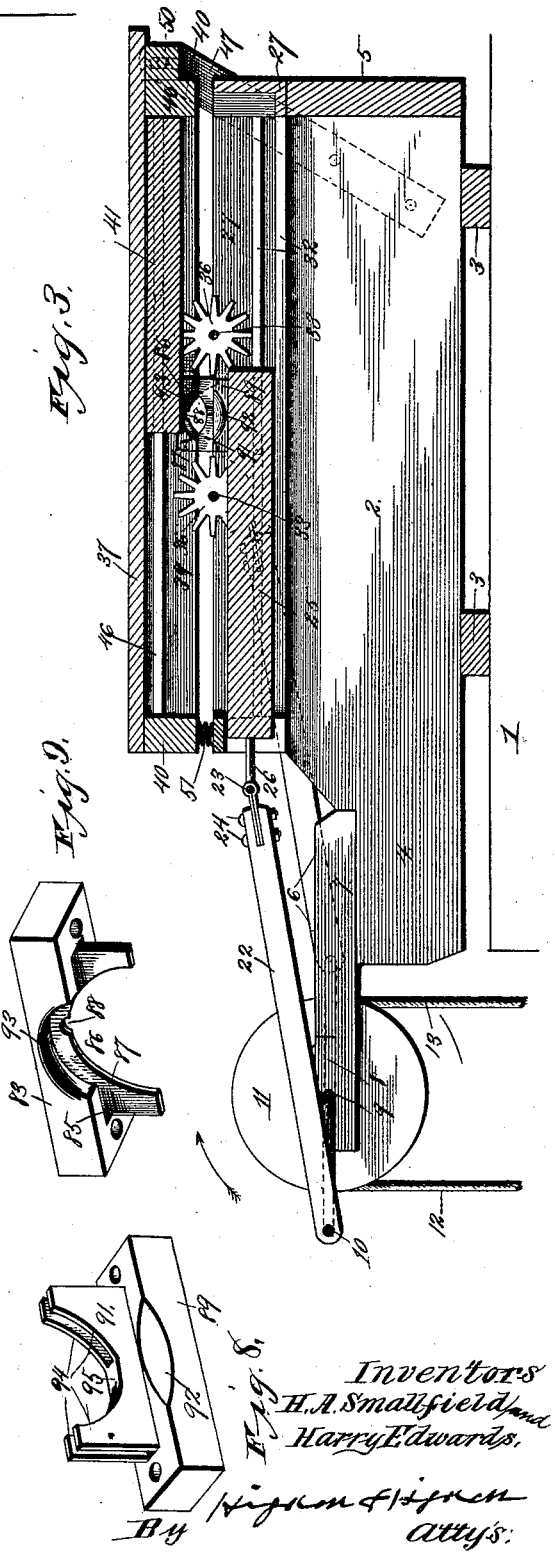

(No Model.) 4 Sheets—Sheet 3.
H. A. SMALLFIELD & H. EDWARDS.
SAUSAGE TWISTING AND LINKING MACHINE.
No. 480,293. Patented Aug. 9, 1892.
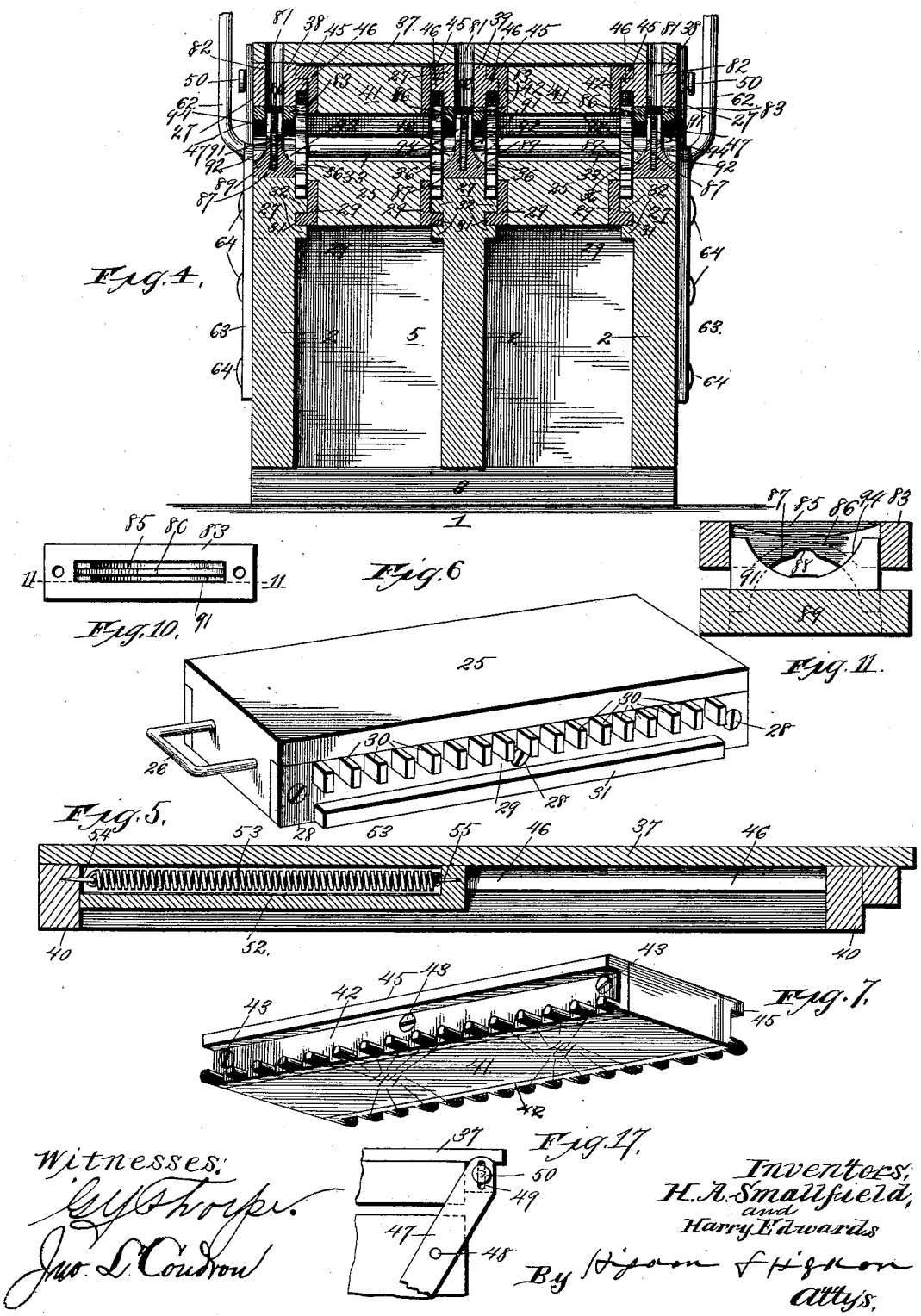

(No Model.) 4 Sheets—Sheet 4.
H. A. SMALLFIELD & H. EDWARDS.
SAUSAGE TWISTING AND LINKING MACHINE.
No. 480,293. Patented Aug. 9, 1892.
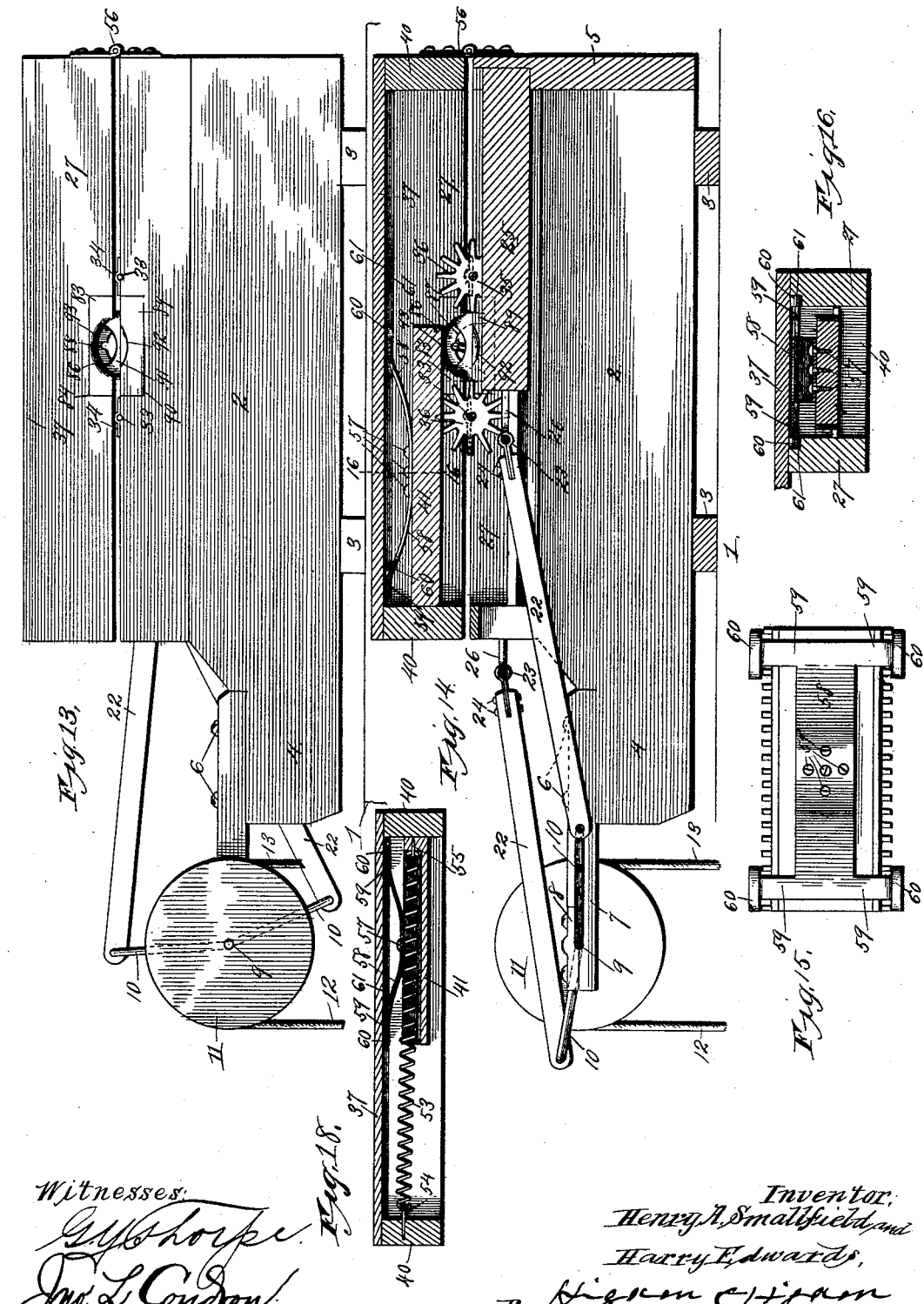

United States Patent Office.

HENRY A. SMALLFIELD, OF KANSAS CITY, MISSOURI, AND HARRY EDWARDS, OF KANSAS CITY, KANSAS.

SAUSAGE TWISTING AND LINKING MACHINE.

SPECIFICATION forming part of Letters Patent No. 480,293, dated August 9, 1892.

Application filed April 4, 1892. Serial No. 427,742. (No model.)

*To all whom it may concern:*

Be it known that we, HENRY A. SMALLFIELD, of Kansas City, Jackson county, Missouri, and HARRY EDWARDS, of Kansas City, Wyandotte county, Kansas, have invented certain new and useful Improvements in Sausage Twisting and Linking Machines, of which the following is a full, clear, and exact description, reference being had to the accompanying drawings, forming a part hereof.

Our invention relates to machines for twisting sausages and forming the same into links or connected sections; and the objects of our machine are to produce a sausage twisting and linking machine which shall be simple, strong, durable, and inexpensive in its construction and rapid and effective in its operations, and by means of which the operations of twisting and linking the sausages can be performed with greater speed and accuracy and with more perfect results than have been heretofore possible; also, to provide a machine by means of which the twisted portions of the sheaths or intestinal coverings between the sausage links or sections can be readily scorched, so as to permanently retain their twisted form.

To the above purposes our invention consists in certain peculiar and novel features of construction and arrangement, as hereinafter described and claimed.

In order that our invention may be fully understood, we will proceed to describe it with reference to the accompanying drawings, in which—

Figure 1:
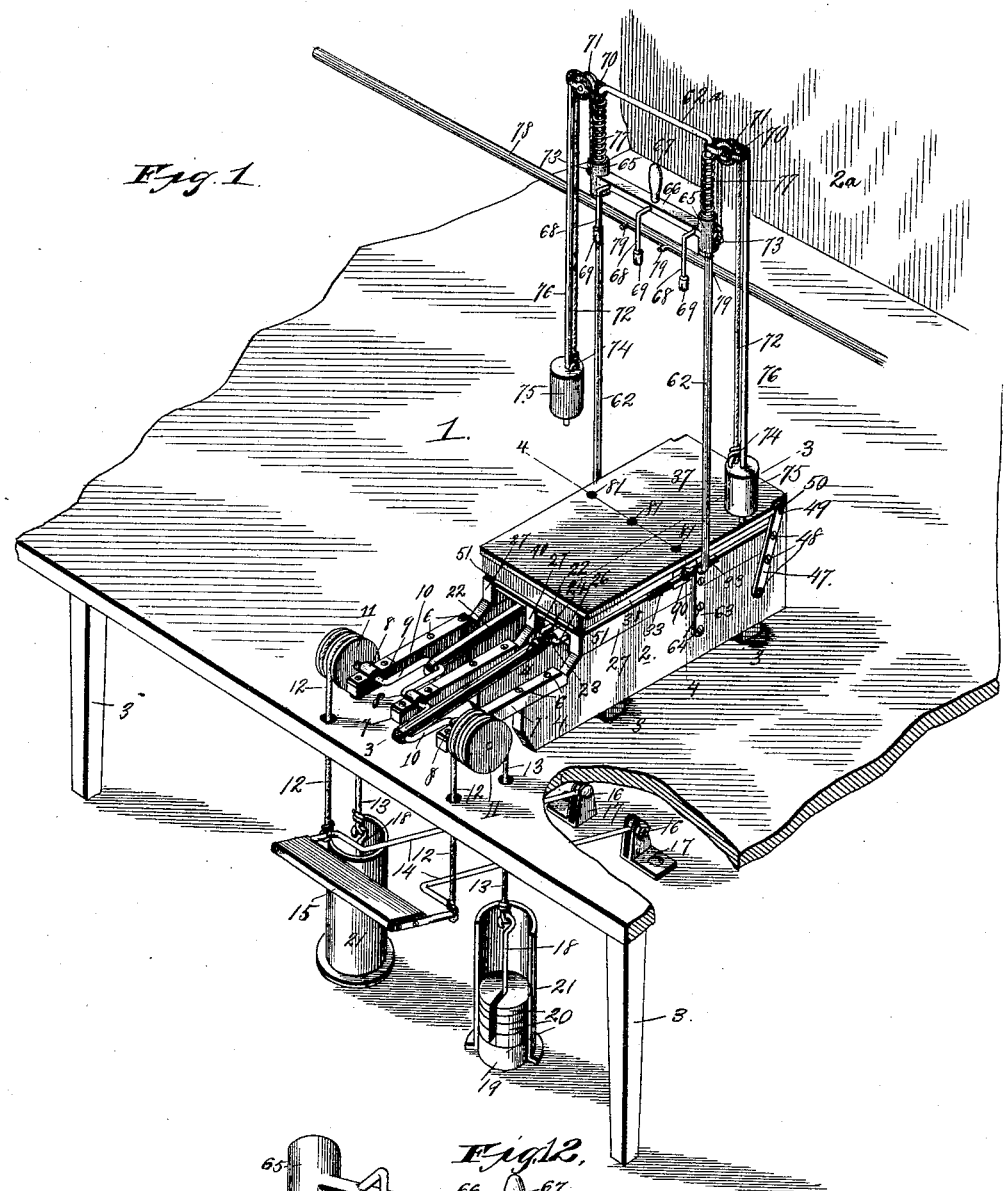
Figure 2:
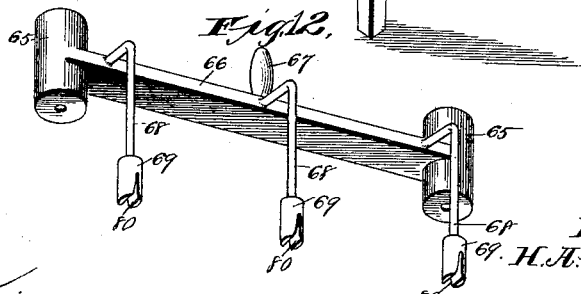

Figure 1 is a perspective view of a sausage twisting and linking machine embodying our invention. Fig. 2 is a plan view of the same, on an enlarged scale, the top or lid of the machine being opened. Fig. 3 is a vertical longitudinal section of the machine, also on an enlarged scale and on the line 3 3 of Fig. 1. Fig. 4 is a transverse vertical section of the machine, also on an enlarged scale and on the line 4 4 of Fig. 1. Fig. 5 is a vertical longitudinal section of the top or cover of the machine on the line 5 5 of Fig. 2. Fig. 6 is a detached perspective view of one of the lower twisting-slides. Fig. 7 is a detached perspective view of one of the upper twisting-slides. Fig. 8 is a detached perspective view of one of the lower creasers or dividers. Fig. 9 is a detached perspective view of one of the upper dividers or creasers. Fig. 10 is a detached plan view of two companion creasers or dividers in operative relative position. Fig. 11 is a vertical longitudinal section of the same on the line 11 11 of Fig. 10. Fig. 12 is a detached perspective view of the scorching attachments. Fig. 13 is a side elevation of a modified form of the machine. Fig. 14 is a vertical longitudinal section of the same, the section being taken through two of the companion slides. Fig. 15 is a detached plan view of one of the twisting slides and its presser-spring employed in the machine shown in Figs. 13 and 14. Fig. 16 is a transverse vertical section of the machine on the line 16 16 of Fig. 14. Fig. 17 is a detached view in side elevation and on an enlarged scale of an end portion of the framework of the machine and of a corresponding end portion of the top or cover of the same, showing one of the adjustable hinge connections for said top or cover. Fig. 18 is a central vertical longitudinal section, on a reduced scale, of the cover of the modified machine shown in Figs. 13 and 14, the direction of view being opposite from that of Fig. 14, and the said figure showing the retracting spring for one of the adjustable upper twisting slides.

Referring first to the construction shown in Figs. 1 to 12, both inclusive, 1 designates a suitable bench or support, which is preferably located horizontally close to a wall 2, and the front or outer part of which is preferably supported by suitable legs 3, as shown, the intention being to arrange a number of the machines hereinafter described side by side, so that the strings of sausage can be successively operated upon by the machines, the operators standing in line at the outer or front side of the bench or support 1.

2 designates the principal supporting-pieces of the machine, these frame-pieces being preferably of wood, but permissibly of metal, if preferred, and being also preferably of oblong rectangular form, as shown. These frame-pieces 2 are placed on edge, so as to extend horizontally lengthwise and longitudinally from front to rear of the machine, the the widths of the frame-pieces extending vertically, and said frame-pieces resting upon and being connected transversely by two or any suitable or preferred number of horizontal strips or cleats 3, which are suitably connected to the lower edges of the frame-pieces. As shown, there are three of the frame-pieces, said pieces extending parallel with each other, one in the middle of the machine and one at each side of said middle piece, the side pieces constituting the sides of the machine-frame, and there being thus two longitudinal spaces or compartments formed within the machine-frame, one at each side of the middle frame-piece 2. It will be understood, however, from the ensuing description that there may be as many more than three frame-pieces 2, and consequently as many as may be desired.

The rear end of the framework of the machine is preferably closed by a vertical end piece 5, as shown, while the front end of said framework is preferably left open. The front ends 4 of the frame-pieces 2 are of less height than the body portion of said pieces and are prolonged longitudinally at the front end of the machine, so as to form parallel, longitudinal and horizontal supports for the power-shaft of the machine, and upon the upper sides or edges of these forwardly-projecting portions 4 are secured by screws 6 or equivalent devices a number of bearing arms or brackets 7. Each of these brackets or arms projects forwardly horizontally from the upper edge of one of the extensions 4 of the frame-pieces 2, and said arms or brackets also extend parallel with each other, as shown. Upon the upper sides of the arms or brackets 7 at the outer extremities thereof are mounted journal-bearings 8, through which works the power-shaft 9 of the machine. This power-shaft is a crank-shaft and extends horizontally and transversely of the machine, said shaft being shown as provided or formed with two oppositely-extending crank-sections 10, it being understood, however, that there are to be as many of the crank-sections 10 as there are longitudinal compartments in the machine. Upon the two opposite ends of the power crank-shaft 10 are mounted two pulleys 11, each of which is formed with two peripheral grooves, in which are oppositely wound two ropes 12 and 13, or cords, chains, or equivalent flexible connections. The lower ends of the flexible connections 12 are suitably connected to the outer portions of two arms 14 of a treadle 15, which extends horizontally beneath the front edge of the bench or support 1. The inner ends of the treadle-arms 14 are pivotally connected, as at 16, to the upper ends of two brackets 17, which are in turn suitably secured to the floor of the apartment in which the machine is located. To the lower end of each flexible connection 13 is connected the upper end of a pendent rod 18, the lower end of said rod carrying an enlargement 19, which supports any desired number of counter-weights 20, as shown. Each of the rods 18 and its enlargement 19 and counter-weights 20 works within a vertical guide 21, which is of semicircular form in cross-section, and which stands vertically upon the floor of the apartment in which the machine is located. The described form of the guides 21 permits the counter-weights 20 to be applied to or removed from the rod 18, as required, to insure the desired counterpoise of the operative connections of the power crank-shaft, as hereinafter fully explained. To each crank-section 10 is connected in the form of a journal the outer end of a connecting-rod 22, there being two of said connecting-rods in the machine, as shown, and both of said rods being of the same length. The rear end of each connecting-rod 22 is connected by an eye 23 or an equivalent device, connected to the rod by through-bolts 24 or equivalent means, to the front end of the corresponding lower twisting-slide 25, a staple 26 or an equivalent attachment to the outer end of the slide serving also to connect the rod 22 to the slide. There are, in the machine shown, two lower twisting-slides 25, and each of said slides is interposed between two top pieces 27, so as to reciprocate longitudinally between the same, as hereinafter more fully explained. Each of the lower slides is preferably of wood, although it may be of metal, if preferred, and said slides are of oblong rectangular form, and also of less length than the top pieces 27, as shown. To the two opposite longitudinal sides of each slide 25 are secured, by screws 28 or equivalent devices, two oblong plates 29, each of which extends longitudinally of the slide. Each of these plates is formed on its outer surface with a longitudinal series of rack-teeth 30, each of which projects horizontally outward from the plate, and said plate is also formed on its outer surface with a longitudinal guide-rib 31, which is located immediately below the said rack-teeth. The guide-ribs 31 work each between two guide-ribs 32, which are formed or suitably secured upon the inner sides of the top plates 27 and also in the vertical sides of the middle plate 27, the arrangement being such that the ribs 31 and 32 insure the proper longitudinal direction of movement of the lower slides.

It is to be understood that, if preferred, the top plates 27 may be dispensed with, the frame-pieces 2 being correspondingly heightened, and the guide-ribs 32 being formed or secured directly upon the sides of said frame-pieces at the upper parts thereof.

33 designates two shafts which extend parallel with each other transversely of the machine-frame and immediately above the lower twisting-slides 25, the ends of said shafts being journaled in bearings 34, upon the outer top plates 27, and the middle portions of the shafts being journaled in bearings 34 upon the middle top plates 27. Each of these shafts carries four star gear-wheels 36, the teeth of which engage between the gear-teeth 30 of the rack-plates 29, above described. The arrangement is such that there are two gear-wheels 36 interposed between each outer top plate 27 and the outer side of the corresponding slide 25, and two other gear-wheels between each side of the middle top plate 27 and the corresponding slide. These gear-wheels 36 are mounted to revolve alternately in opposite directions upon the shafts 33 and are actuated by the reciprocating movements of the lower twisting-slides 25.

37 designates the top or cover of the machine, the said top or cover being of oblong rectangular form and of such dimensions as to completely cover the spaces in which the slides 25 reciprocate. To the under surface of this top or cover 37 are suitably secured two outer longitudinal side strips 38 and a central longitudinal guide-strip 39, the ends of said strips being connected preferably by cross-strips 41, which are also secured suitably to the under surface of the top or cover 37 at the ends thereof. Between the middle guide-strip 39 and the two outer guide-strips 38 are interposed the two upper twisting-slides 41, each of these slides being preferably of wood, although said slides may be of metal, if preferred. The twisting-slides 41 are of oblong rectangular form and correspond in dimensions with the lower twisting-slides 25, and at its opposite sides each of the upper twisting-slides is provided with a rack-plate 42, which corresponds in length with the slide and which is secured to the slide by screws 43 or equivalent means. There are thus two of the rack-plates 42 for each slide 41, and upon the outer surface of each rack-plate is formed a longitudinal series of outwardly-extending rack-teeth 44. These rack-teeth occupy the same position relative to the slides 41 that the rack-teeth 30 occupy relative to the slides 25; but said teeth 44 are in the form of pins or studs, while the rack-teeth 30 are of the usual form, the purpose of the described form of the teeth 44 being related to the required vertical adjustments of the top or cover 37, as will be hereinafter explained. At its upper margin each side of each slide 41 is formed with a longitudinal outwardly-extending guide-rib 45, which engages the upper side of a longitudinal guide-rib 46, which is formed upon or suitably secured to the corresponding side of the adjacent middle or outer strip 39 or 38 of the top 37.

The top or cover 37 is connected at its rear end to the framework of the machine by two hinge-straps 47, which are secured by screws 48 or equivalent devices to opposite sides of the machine-frame near the rear ends thereof. These hinge-straps 47 extend obliquely upward and rearward, and at its upper end each of said straps is formed with a vertical slot 49, through which extends and in which works a stud or pin 50, which projects outwardly from the corresponding side of the adjacent end of the top or cover 37. It is to be understood that there are two of these slotted hinge-straps 47 and studs or pins 50, one of each at each side of the machine-frame, and that the arrangement of said parts is such as to permit the top or cover 37 to yield vertically or to rise or fall, according as sausages of greater or less thickness are being twisted and linked, as will be hereinafter fully explained. The opposite or front end of the top or cover 37 is supported so as to be also vertically adjustable, for the purpose above mentioned, by a pair of spiral springs 51, which are interposed between the under side of the front end of the top or cover and the upper side of the front end of the machine-frame and which are carried either by the top or cover 37 or by the said front end of the machine-frame, as preferred. The upper twisting slides 41 are actuated solely by the lower twisting slides 25 through the medium of the star gear-wheels 36, so that each of the upper slides 41 moves oppositely from the companion lower slide 25 at each throw of said lower slide.

It is to be understood that at times the top or cover 37 is raised into vertical position, and that when the machine is in its proper starting position the right-hand lower twisting slide 25 (looking from the front of the machine) is at the rear end of its throw, the left-hand lower slide being at the forward limit of its throw, and consequently the upper left-hand twisting slide is at the front limit of its throw, while the upper right-hand twisting slide is at the rear limit of its throw. Consequently, it will be further seen that when the operation of the machine is stopped and the cover or top 37 is raised into vertical position, the upper left-hand twisting slide would drop downward, so that when the cover or top was again closed the said upper slide would be directly over the companion lower slide at the rear end of the top or cover and consequently out of working position and a hinderance to starting the machine. In order to retain this left-hand upper slide 41 in its required position at such times, the following attachments are employed: In the upper surface of the said upper slide 41 is formed a longitudinal groove 52, within which lies a spiral spring 53, the front end of said spring being attached by a staple 54 or equivalent means to the inner side of the front portion 40 of the top or cover, while the rear end of said spring is secured by a similar staple 55 or equivalent means to the rear end of the groove 52. Now the spring 53 acts normally by contraction to retain the slide at the front limit of its throw, the spring, however, readily extending during the rearward movement of the slide, so as in no wise to impede such movement.

In Figs. 13, 14, 15, 16, and 18 we have shown a machine having a modified arrangement of the upper twisting-slides 41 and of the top or cover 37. In this instance the top or cover 37 is connected at its rear end directly to the rear end of the framework of the machine by any suitable or preferred number of hinges, the said hinges having stationary pintles and the front end of the top or cover rests directly upon the framework when said top or cover is in closed position. Thus it will be seen that in this instance the cover or top is not vertically adjustable or yielding, as before. In order, therefore, to enable the upper slides to yield or adjust themselves vertically to accord with varying thickness of sausages, we provide the following attachments: To the upper surface of each slide 41 is secured by any suitable or preferred number of screws 57 or equivalent means a segmental spring-plate 58, the said attaching devices 57 passing through the middle of the spring-plate, and the concave surface of said spring being uppermost. The extremities of each spring-plate 58 are formed each with two oppositely-disposed and outwardly-projecting extensions 59, each of which is formed at its outer extremity with a transverse enlargement 60. These enlargements work in longitudinal grooves 61, which are formed in the inner sides of the strips 38 and 39 of the top or cover 37, the springs and their enlargements thus supporting the slides 41, as well as guiding the same in their movements. It will thus be seen that when thicker sausages are being twisted and linked, as hereinafter explained, the slides 41 will rise, compressing the springs 58, and that when the more slender sausages are being twisted and linked the springs will press the slides 41 downward upon the sausages.

We will now proceed to describe the attachments for scorching the twists which intervene between the sausage-links.

62 designates two guide-standards which rise vertically from opposite sides of the machine-frame about midway of the length of the same, the lower ends 63 of the said standards being preferably enlarged, as shown, and secured to the machine-frame by screws 64 or equivalent means, and the upper ends of said standards being connected by a horizontal cross-piece 62ª. These standards 62 are each surrounded by a slide 65, these two slides being connected by a horizontal cross-bar 66, which is provided with a suitable handle 67, said handle being either of the precise form shown or of any other suitable or preferred form. From the cross-bar 66 extend forward and downward three or any suitable or preferred number of inverted-L-shaped hangers 68, upon the lower ends of which are formed or suitably secured a corresponding number of scorching-tips 69, the form of which will be presently fully explained. From the upper end of each standard 62 extends outward a bracket 70, in which is journaled a sheave or peripherally-grooved wheel 71, over which runs a rope 72 or a chain or other suitable flexible connection. There are thus two of these brackets, sheaves, and flexible connections for the machine, and one end of each flexible connection is secured, as at 73, to each of the slides 65. The opposite end of each flexible connection 72 is connected, as at 74, to a counter-weight 75, and loosely through each of said counter-weights passes a vertical guide-rod 76, which is pendent from the corresponding bracket 70. A spiral cushioning-spring 77 is interposed between the upper end of each slide 65 and the outer end of the cross-bar 62ª, and serves by compression to prevent jarring of the parts when the cross-bar 66 is permitted to rise, as hereinafter fully explained.

78 designates a supply-pipe for gas or other suitable fuel, the said pipe being suitably supported in horizontal position above the bench or support 1, so as to extend longitudinally of the same, and said pipe is provided with three or any other desired number of burner-tips, as 79. The arrangement is such that the pipe 78 supplies flame to the entire number of machines, and the pipe is placed at such a height that when the cross-bars 66 are in raised position the flames from the burner-tips 79 shall impinge directly upon the scorching-tips 69 and thus keep the latter properly heated. Each of the scorching-tips 69 is notched or recessed longitudinally at its lower end, as at 80, so as to form two arms at the lower end of the tip, as shown, and for a purpose to be hereinafter explained.

81 designates three openings, which are formed through the top or cover 37 of the machine, one at the middle of said top or cover and the others near the side margins of the same, said openings communicating at their lower ends with similar openings 82, one of which is formed vertically through the middle strip 39 of the top or cover and the others of which are formed each through one of the side strips 38 of said top or cover. To the under sides of the middle and side strips of the top or cover 37, midway of the length thereof, are secured, as at 84, or in any other suitable or preferred manner, three plates 83, each of which is formed with a longitudinal slot 85, one of said plates being secured to the middle strip 39, and the other plates each to the under side strips 38, as shown. Within each of the slots 85 is located a creasing-blade 86, which is pendent below the under surface of the plate, and the lower edge of which is quite blunt and of concave segmental form, a recess 88 being formed in the middle of the margin or edge 87 of each blade, as shown, and for a purpose to be hereinafter explained. In the upper edges or margins of the frame-pieces 2 are secured, as at 90, three or any other suitable or preferred number of plates 89, which are located directly below the plates 83, and each of which is formed on its upper side with a longitudinally-extending and also longitudinally-divided receiver 91 for the creaser-blade 86 of the corresponding plate 83. A concave recess 92 is formed in the upper side of each plate 89 and a concave recess 93 is formed in the under side of each plate 83, said recesses 92 and 93 serving to form the rounded ends of the sausage-links during the operation of the machine. The upper margin 94 of each receiver 91 is of concave segmental form, and midway of its length each of said receivers is formed with a closed portion 95, for a purpose to be hereinafter explained.

It is to be understood that, excepting with regard to the modified features of construction shown in Figs. 13, 14, 15, 16, and 18, and described above, the parts of the machine shown in said figures are similar to the same parts of the machine shown in Figs. 1 to 12, inclusive, and in so far similar numerals of reference are used to designate the parts in all of the figures.

The operation of the machine is as follows: The top or cover 37 is first raised and a string of unlinked and untwisted sausage is placed across the top of the machine-frame, so as to lie upon the concave margins 94 of the receivers 91. In the machine shown in Figs. 1 to 12, and also 17, the cover is now closed down and the operator presses with one hand upon the cover, so as to retain the same in its required closed position. In the machine shown in Figs. 13 and 18 (excepting Fig. 18) the operator simply closes the cover and does not press upon it, since the springs 58 cause sufficient pressure upon the sausage, and at the same time compensate for varying thickness of the latter. In either case the blades 86 enter the receivers 91, the recesses 88 permitting a portion of the sheath or casing to pass through them to be twisted, while the recesses 92 and 93 form the rounded ends of the sausage-links. After having thus closed the cover the operator presses the treadle 15 downward with his foot, and thus imparts one-half a revolution to the crank-shaft 8, this movement causing one lower slide 25 to move from the front to the rear end of the machine, and the other lower slide 25 to move from the rear end to the front end of the machine. These movements of the lower slides acting through the gear-wheels 36 cause the upper slides to move each oppositely from its companion lower slide, and thus the two sausage-links within the machine are rotated in opposite directions, forming the twists. The operator now keeps his foot upon the treadle, so as to retain it in depressed position, and grasps the handle 67, moving the scorchers downward through the openings 81 and 82, and causing the bifurcated lower ends of the scorchers to come into contact with the twists, so as to heat and set the same, thus preventing the twists from unwinding after the links are removed from the machine. After this scorching has been completed the operator releases the handle 67 and the weights 75 descend and raise the cross-bar 66, so that the scorcher-tips shall be subjected to the action of the flames from the burner-tips 79. Finally the operator raises the cover 37 and removes the sausage and then removes his foot from the treadle 15, allowing the weights 20 to revolve the crank-shaft 8 one-half a revolution in the reversed direction from that of its first movement and bringing the slides into setting position. The subsequent operations of the machine are repetitions of those above described.

From the above description it will be seen that we have produced a machine which is simple, strong, durable, and inexpensive in construction, easily and rapidly operated, and which perfectly twists and links the sausage.

Having thus described our invention, what we claim as new therein, and desire to secure by Letters Patent, is—

1. A sausage twisting and linking machine comprising an oscillating counterweighted power crank-shaft, a number of lower oppositely-reciprocating twisting-slides operatively connected to the crank-shaft, a number of upper oppositely-reciprocating twisting-slides, and a number of gear-wheels interposed between the lower and upper slides and operating to reciprocate each upper slide oppositely from the reciprocation of the companion lower slide, substantially as set forth.

2. A sausage twisting and linking machine comprising an oscillating power crank-shaft, a number of grooved pulleys mounted upon said shaft, a treadle, flexible connections from the treadle wound upon the pulleys, counterweights, and flexible connections from said counter-weights wound oppositely upon the pulleys from the direction of winding of the treadle connections, substantially as set forth.

3. A sausage twisting and linking machine comprising a number of lower oppositely-reciprocatory twisting-slides, an oscillating power crank-shaft operatively connected to said slides, a number of gear-wheels operated by said lower slides, and a number of vertically-adjustable upper slides operated by the said gear-wheels and carried by the top of the machine, substantially as set forth.

4. A sausage twisting and linking machine comprising a number of oppositely-reciprocatory twisting-slides, and yielding supporting-springs carried by the slides and working in guides in the machine, substantially as set forth.

5. A sausage twisting and linking machine comprising a number of oppositely-reciprocating twisting-slides, a hinged top or cover carrying said slides, and a retracting-pin connected at one end to the top or cover and at its opposite end to the slide, substantially as set forth.

6. A sausage twisting and linking machine comprising a suitable framework, a cover hinged upon said framework, a number of creasing-blades carried by the cover and pendent therefrom, and a number of longitudinally-divided receivers for said blades carried by the framework of the machine, and each located directly beneath one of the creasing-blades, substantially as set forth.

7. A sausage twisting and linking machine comprising a suitable framework, a cover hinged upon said framework, a number of creasing-blades carried by the cover and pendent therefrom, a number of longitudinally-divided receivers for said blades carried by the framework of the machine and each located directly beneath one of the creasing-blades, and openings through the top and frame of the machine for affording access to opposite sides of the creasing-blades, substantially as set forth.

8. A sausage twisting and linking machine comprising a number of vertically-movable scorchers, each having a bifurcated lower end, substantially as set forth.

9. A sausage twisting and linking machine comprising a suitable machine-frame, a number of standards extending vertically upward from said frame, a number of slides movable upon said standards, a cross-bar connecting said slides, a number of scorchers carried by said cross-piece, counter-weights, and flexible connections for attaching the weights to the slides, and brackets and pulleys carried by the standards, substantially as set forth.

In testimony whereof we affix our signatures in the presence of two witnesses.

HENRY A. SMALLFIELD.
    HARRY EDWARDS.

Witnesses:
 H. E. PRICE,
 JNO. L. CONDRON.